Feb. 26, 1952     F. E. STIRNKORB     2,586,881
DRIVING UNIT FOR ELECTROMAGNETIC VIBRATION EXCITERS
Filed Jan. 3, 1950
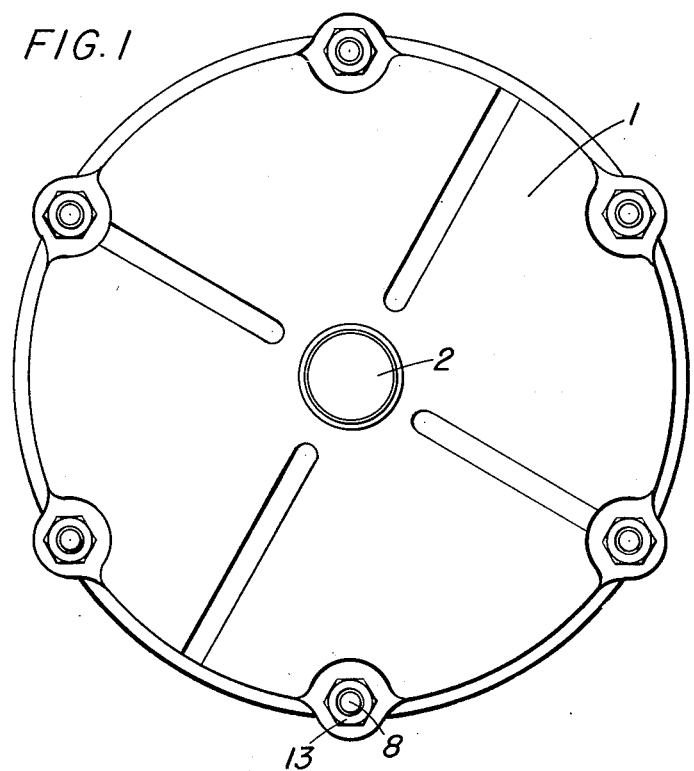
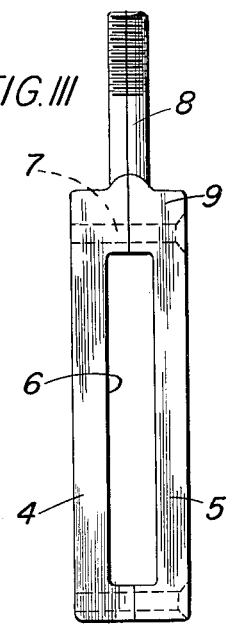
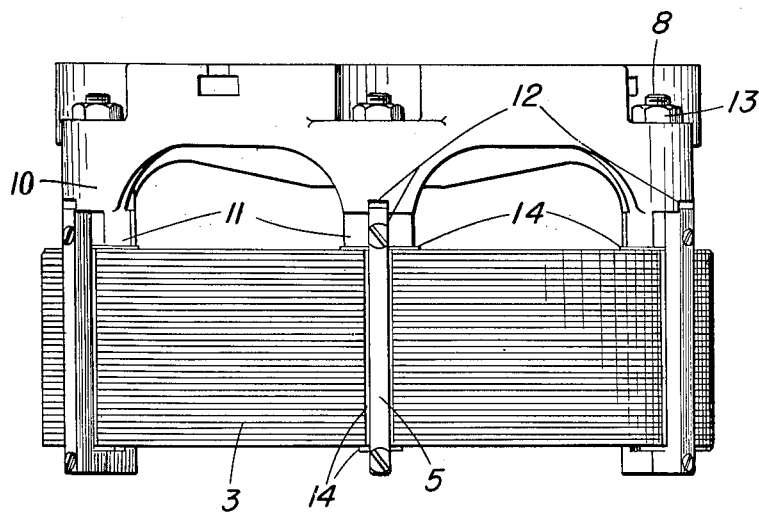
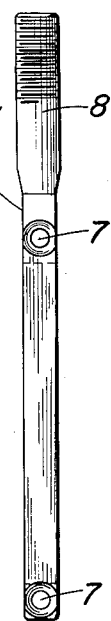
Inventor
Fred E. Stirnkorb
By his Attorneys
Howson and Howson Patented Feb. 26, 1952

2,586,881

UNITED STATES PATENT OFFICE 2,586,881

DRIVING UNIT FOR ELECTROMAGNETIC VIBRATION EXCITERS

Fred E. Stirnkorb, New Haven, Conn., assignor to The M B Manufacturing Company, Inc., New Haven, Conn., a corporation of Connecticut Application January 3, 1950, Serial No. 136,568

5 Claims. (Cl. 175—21)

This invention relates to a driving unit for a vibration exciter and more particularly to a mounting for the movable coil on the driver table of an electromagnetic vibration exciter. The coil and driver table of such an exciter must be rigidly fastened together and move as a driving unit in response to the electromagnetic forces produced in the machine. The driving unit may have to oscillate over distances up to one inch with a frequency up to say several hundred cycles per second. The unit delivers controlled forces up to say two hundred pounds to the object to be tested. It has been found that the methods of attaching the coil heretofore used were not sufficient to prevent relative vibration between the table and the coil when in use. I have found a simple means of attaching the two together which so mounts the coil that vibration between the coil and the table can be prevented although the machine is subjected to hard and continuous use. My mounting for the coil is characterized by means which clamp the coil vertically between the clamp and the table in an adjustable manner. At the same time it provides means which clamp the coil on the inside and the outside.

In the drawings:

Figure 1 is a plan view of a driver or shaker table of an electromagnetic vibration exciter built in accordance with my invention;

Figure 2 is a side elevation of the major elements of the driving unit of an electromagnetic vibration exciter made in accordance with my invention, showing the adjustable attachment of the clamps and the movable coil to the driver table;

Figure 3 is a side elevation of my novel clamp; while

Figure 4 is an edge elevation of the clamp of Fig. 3.

In electromagnetic vibration exciters of the type here referred to, a stationary electromagnetic field is established by a direct current field coil or other means which induce forces on a movable coil proportional to the current carried by the movable coil. Therefore, an alternating current produces a vibrational movement in the moving coil. This movable coil and the table on which the object to be tested is fastened constitute the major elements of the movable or driving unit of such an exciter. The strength and rapidity of the vibrations induced in the driving unit are great, and experience shows that ordinary means to hold the coil and table together are not sufficient to prevent development of relative vibration between them. For testing or calibration purposes, it is essential that there be no relative movement between the parts of the driving unit, and I have found a means which prevents the development of any such vibration within the driving unit.

In the embodiment shown in the drawings, the table 1, which may be of a light-weight material such as aluminum, is in general circular in the horizontal dimension and is flat on top in order that the object to be tested or calibrated may easily be fastened to it. There is an opening 2 in the center of the table in which can be fastened an aluminum tube (not shown) to attach the flexures, which are the flexible elements that permit the coil and table to move vertically without moving laterally. The means by which I keep the coil and table rigid and compact with relation to each other will now be set forth. It must be understood that my invention is equally applicable to types of exciters in which the table acts only as a frame, the object to be tested in that case being attached to the tube. The coil 3 is made of several layers of wire or thin flat strip material with the flat side in the horizontal dimension, the coil being of substantial axial length and being circular and of approximately the maximum diameter of the frame or table 1. It should be understood that where I speak of "horizontal" or "vertical," these terms are merely relative as the exciter can work equally well at other angles. For example, the exciter can be used to induce vibrations in a horizontal direction.

The novel clamp which I have devised is adapted to enclose the coil and hold it up against the table so that the coil is held between the clamp at the bottom and the table at the top. To this end I make each of my clamps of two substantially U-shaped separable parts 4, 5, which when assembled provide a closed vertical slot 6 through which the coil can pass. These two parts are held together by fastening means such as screws 7, one below and one above the slot in which the coil lies. These separable parts terminate together above the coil in a rounded upper end or shank 8 which is circular in cross-section and can be threaded for the reception of a nut. Below this rounded threaded upper end, or shank 8 but above the slot 6, the two parts are flat-sided not only in the faces toward the coil but also in the side faces 9. These extend for at least a short distance above the coil.

I place a number of these clamps around the table, the example in the drawings showing six such clamps. The table is perforated near the periphery at these six points. The rounded upper end 8 of a clamp projects upwardly through each such hole and a nut 13 is screwed onto the upper end of the clamp on the top side of the table. With the clamps fastened on the coil it will be seen that the vertical grip on the sections of the coil is adjustable individually at these points around the table by turning of the nuts. I have found that by having the clamps directly underlie the coil at this multiplicity of points and shaping the table to provide complemental downwardly directed legs 10 having shoulders 11 adjacent each clamp, it is possible to get a direct clamping action at a multiplicity of points which is very effective in maintaining rigidity in the driving unit. To this end each leg 10 has a shoulder 11 on each side of its clamp, the leg being slotted at 12 between these shoulders to receive the flat faces 9 and upper end 8 of a clamp. The center of the slot of course is enlarged to a rounded cross-section to receive the end 8. The slot 12 beside the round hole is flat and extends radially both inwardly and outwardly beyond the coil so as to hold the flat side faces 9 and therefore the entire clamp from twisting about the longitudinal center line of the clamp. It also further ensures the clamp being held at right angles to the driver table. It will be seen that with this attachment each nut 13 on the top of the table is able to draw its clamp upwardly until the shoulders 11 on the legs 10 press downwardly on the coil and hold it firmly between those shoulders and the bottom of the clamp.

In addition, the slot in each clamp is of such width as to be adapted to grip the coil on the inside and the outside, thereby assisting in maintaining the coil rigid. I prefer to place cloth 14, paper or the like, between the bottom and sides of the clamp 4, 5 and the shoulders 11, on the one hand, and the coil 3, on the other. If it is desired to prevent induced currents flowing around the clamps, the continuous metal path around each clamp can be destroyed by adding insulating material at the bottom of the clamp between the parts 4 and 5, and around the shank and head of the lower screw 7.

It will be observed that with this arrangement there is provided a clamping action with screws in a radial dimension both at the top and bottom of the coil, i. e., between the two parts of the clamp, and a vertical clamping action with screws between the bottom of the clamps and the shoulders on the table at a multiplicity of points around the coil. At the same time it will be seen that the device is of the utmost simplicity and yet maintains the clamps in an accurate vertical relation with the top of the table and also prevents the clamps from twisting about their individual axes, as heretofore mentioned. In this way, the clamping forces can be individually adjusted to give optimum tightness without coil distortion. Correct clamp tightening greatly improves the connection between the moving coil and table, giving greater resistance to the development of looseness during hard surface conditions. Looseness between the movable coil and table causes distortion of the transmitted force due to impact shock associated with relative motion between these parts and destroys the precision and quality of the imparted vibration to the table. If looseness is allowed to continue, usually complete failure of the connection results in a relatively short period of operation.

What I claim is:

1. A driving unit for an electromagnetic vibration exciter comprising an electric coil having substantial axial length, a frame overlying one axial end of said coil, and spaced legs extending from said frame adapted to engage said one end of said coil in a direction axially of said coil, in combination with a plurality of clamps one attached to each of said legs and each including an end portion underlying the coil at the axial end thereof remote from said one end, and means extending between said frame and said clamps for moving said clamps toward said legs, whereby upon movement of said clamps toward said legs, the coil is pressed at a plurality of spaced points between the legs and the underlying end portions of the clamps in a direction parallel to the axis of the coil.

2. A driving unit for an electromagnetic vibration exciter according to claim 1 in which each of said clamps includes means for individually adjusting said clamp with relation to the frame in a direction axially of the coil, whereby the axial clamping pressure on the coil between the legs and the underlying end portions of the clamps can be adjusted separately at a plurality of points around the coil.

3. A driving unit for an electromagnetic vibration exciter according to claim 1 in which each leg and the portion of the frame adjacent each leg has a bore therethrough extending in a direction parallel to the axis of the coil, and in which the means extending between the frame and each of said clamps for moving the clamps toward the legs comprises a shank at the end of each clamp which passes through the bore in each leg and through the bore in the adjacent portion of the frame and is engaged by fastening means for each clamp on the surface of said frame remote from the coil.

4. A driving unit for an electromagnetic vibration exciter according to claim 1 in which the end of each leg which engages said one end of said coil is slotted in a direction radially of said coil to form a slot having an open end facing toward said one end of said coil, and a portion of one of the clamps above the coil is flat faced and fits into the open ended radial slot in one of said legs and engages the walls defining the sides of said slot, whereby the said clamp is prevented from twisting about its own axis.

5. A driving unit for an electromagnetic vibration exciter according to claim 1 in which each clamp is composed of two substantially U-shaped separable parts which together enclose said coil on the inside and outside as well as at the end remote from said frame, and wherein means are provided for clamping said parts together, whereby said coil is gripped by each clamp on its inside, outside and at the end remote from said one end of said coil and is gripped at said one end by engagement of said end with the end of the leg with which said clamp is associated.

FRED E. STIRNKORB.

REFERENCES CITED

The following references are of record in the file of this patent:

UNITED STATES PATENTS

| Number | Name | Date |
| --- | --- | --- |
| 2,372,950 | Holmberg et al. | Apr. 3, 1945 |
| 2,497,204 | Boterweg | Feb. 14, 1950 |

FOREIGN PATENTS

| Number | Country | Date |
| --- | --- | --- |
| 120,113 | Austria | Dec. 10, 1930 |